July 25, 1961 A. R. WHITTAKER 2,993,375
FLUID METER
Filed Nov. 14, 1956 2 Sheets-Sheet 2

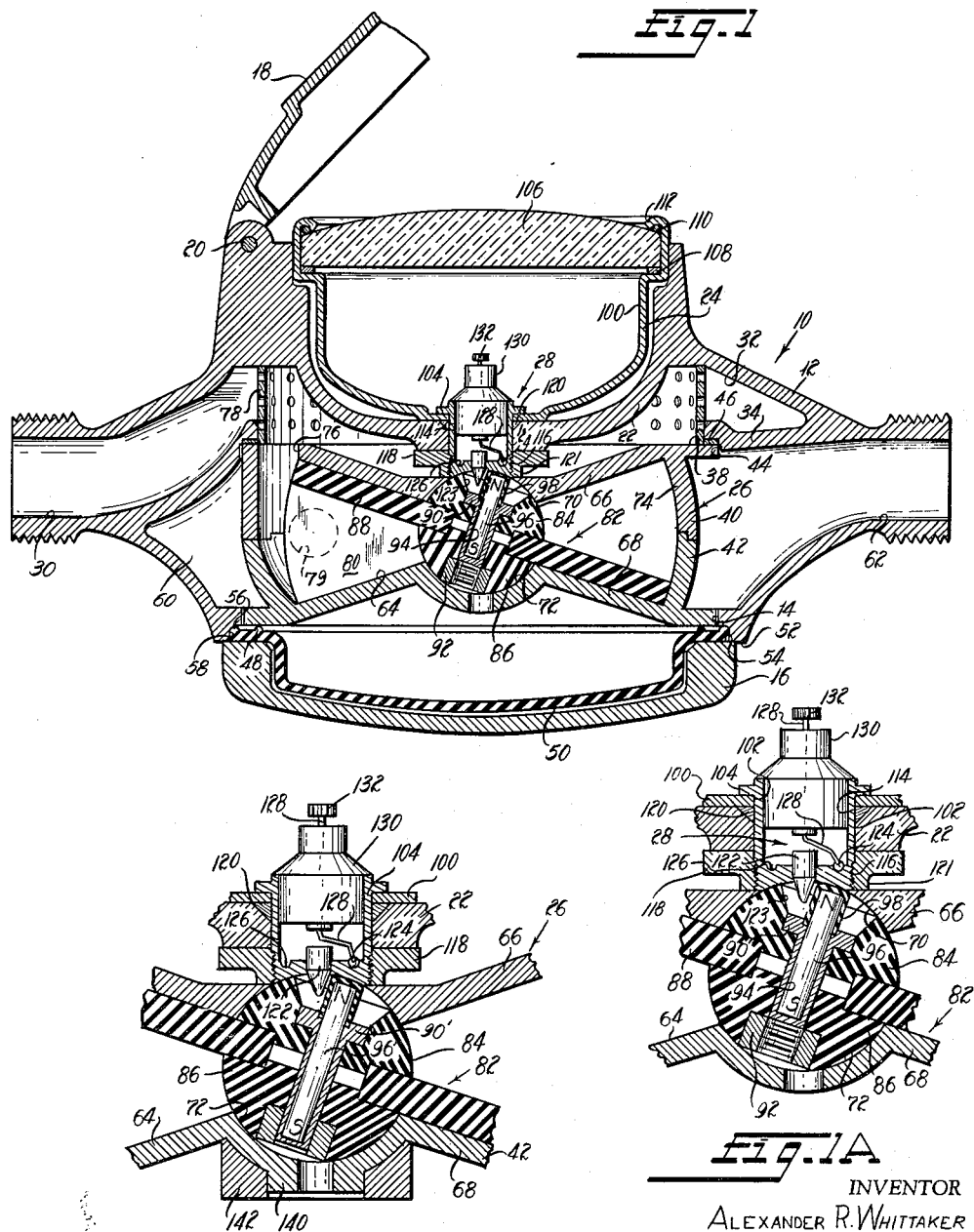

INVENTOR
ALEXANDER R. WHITTAKER

BY

ATTORNEYS

United States Patent Office 2,993,375
Patented July 25, 1961

2,993,375
FLUID METER
Alexander R. Whittaker, Beech Haven, N.J., assignor to Rockwell Manufacturing Company, Pittsburgh, Pa., a corporation of Pennsylvania
Filed Nov. 14, 1956, Ser. No. 622,186
14 Claims. (Cl. 73—258)

The present invention relates to improvements in liquid meters, and more particularly in improvements in liquid meters of the nutating disk type.

In nutating disc type liquid meters, it is essential for accurate meter registration that the nutating disc be so accurately guided throughout its path of nutating movement in response to liquid flow through the meter that the opposite sides of the disk are maintained in contact with the top and bottom walls of the measuring chamber at diametrically disposed regions to prevent loss of liquid past the nutating disc and concomitant loss of registration. Heretofore, in nutating disc type meters, it has been customary to provide a cylindrical pin, commonly called a control bar, fixed coaxially to the disc and engaging the frusto conical surface of a control ring or guide roller coaxial with the measuring chamber and which is either mounted interiorly of the measuring chamber or within the meter casing exteriorly of the measuring chamber. United States Patent No. 1,903,074, issued March 28, 1932, to H. G. Weymouth for Meter and Patent No. 2,129,943 issued September 13, 1938, to E. M. Kruger for Disc Meter disclose typical structures of such prior art meters.

Until recent years, it has been customary in nutating disc meters to provide a mechanical drive connection between the nutating disc and the register. Recently, in order to provide a low friction fluid tight drive, magnetic drive couplings through a static fluid seal have been used. Examples of such structures will be found in copending application Serial No. 485,864 filed February 3, 1955, by C. C. Treff et al. for Meters now Patent No. 2,921,468, issued January 19, 1960.

In all such meters the dimensions of the measuring chamber, the dimensions of the disc mounted within the measuring chamber, and the dimensions of the parts controlling the path of movement of the disc must be machined within extremely accurate tolerances, in the order of fractions of one thousandth of an inch, in order to assure that there will be no material loss of registration as liquid passes through the meter due to leakage past the disc. In such prior art construction where the control ring is mounted on the meter casing, these extremely close tolerances require very accurate location of the measuring chamber and the cooperating gear train within the meter casing and when the control ring is within the measuring chamber very accurate location of the control ring axis relative to the machined walls of the measuring chamber. Due to the extremely complicated configurations of the meter casing and the measuring chamber casing, the maintenance of such tolerances on separately machined parts presents a very different and high cost machining operation.

The present invention provides an improved structure which completely eliminates the necessity for extremely accurately located control rings and guide pins for the nutating disc whether the control ring be located on the measuring chamber castings or on the meter casting and in both magnetically and mechanically coupled meters.

It is the primary object of the present invention to provide a new and improved means for so controlling the movement of the nutating disc throughout its nutating path of movement as to prevent loss of registration and which eliminates the necessity of the accurately machined surfaces required in order to locate the control ring and control bar to assure proper movement of the nutating disc.

It is a further object of the present invention to provide a nutating disc type meter having magnetic means for controlling movement of the nutating disc.

It is a further object of the present invention to provide a nutating disc type meter of such improved construction that the necessity of accurately machined surfaces for maintaining coaxial alignment between the register and the measuring device is eliminated by the provision of a magnetic coupling drive connecting the nutating disc and the register and magnetic means for controlling the nutating disc throughout its path of movement in response to fluid flow.

These and other objects of the present invention will become more fully apparent by reference to the appended claims and as the following detailed description proceeds in reference of accompanying drawings wherein:

FIGURE 1 is a vertical section through a magnetically coupled nutating disc type water meter constituting a first embodiment of the present invention;

FIGURE 1A is an enlarged portion of FIGURE 1;

FIGURE 2 is a fragmentary sectional view of a nutating disc type water meter similar to FIGURE 1 but of modified construction constituting a second embodiment of the present invention.

Figure 3:
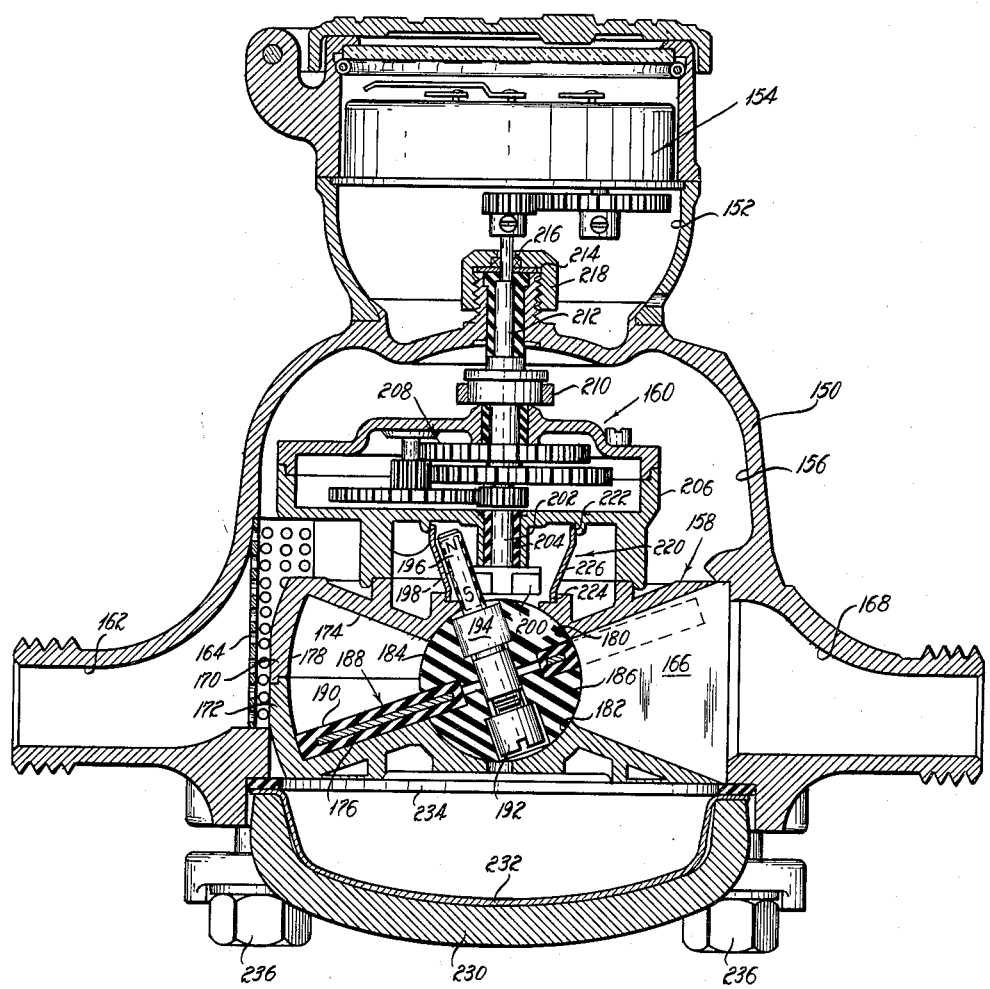
FIGURE 3 is a vertical section through a mechanically coupled nutating disc meter constituting a third embodiment of the present invention.

Referring now to the drawings in particularly to FIGURE 1, the nutating disc meter 10 therein illustrated is provided with a meter casing consisting of a metal casting 12 having a bottom access opening 14 closed by a frangible frost plate 16 secured thereto by lugs (not shown), and a top cover 18 pivoted to the casting 12 by pivot pin 20. The top of casting 12 is formed with an externally concave wall 22 in which is received a hermetically sealed meter register assembly 24. A nutating disc type measuring chamber unit 26 is disposed within the casting 12 and is drive coupled to the register 24 by a magnetic drive coupling 28.

Casting 12 is formed with an inlet opening 30 which is in fluid communication with an annular inlet chamber 32 formed within casting 12 in surrounding relation to the lower portion of the wall 22 and above an internal transverse partition 34. The transverse partition 34 is formed with a central through aperture 36 which is closed by the top wall 38 of the upper half 40 of the two part casing of the measuring chamber unit 26 formed by mating parts 40 and 42. Top wall 38 of housing part 40 is received in an annular groove 44 in the lower side of the partition 34 about the opening 36 with a slight radial clearance. Fluid tight relationship between partition 34 and wall 38 is established by a gasket 46 interposed between the top wall 38 and the opposed surface of the groove 44. Housing parts 40 and 42 are biased together and against gasket 46 by a continuous resilient annular bead 48 abutting the lower face of part 42 and formed integrally with the frost plate liner 50. Liner 50 is formed of synthetic or natural rubber. The resilient biasing force upon the housing parts 40 and 42 by the annular bead 48 is of predetermined magnitude independent of the degree of tightness in which the frost plate 16 is secured to the casting 12 due to the abutment between the mating surfaces 52 and 54 of the casting 12 and the frost plate 16 respectively. Fluid tight relationship between the frost plate 16 and the casting 12 is maintained by the peripheral bead 56 which is received within the recess 58 of the casting 12 about the opening 14 and is compressed to a predetermined magnitude to maintain the seal for the same reason as herein above explained. Measuring chamber housing parts 40 and 42 co-act with the internal wall of the casting 12 between the seals formed by the gasket 46 and the bead 48 on the frost plate liner 50 to define an annular fluid outlet chamber 60 surrounding the casing parts 40 and 42. Chamber 60 is in fluid communication with the outlet port 62 of the meter casting 12.

The measuring chamber unit 26 consists of the two housing parts 40 and 42 which define a measuring chamber 64 having opposed coaxial frusto conical top and bottom walls 66 and 68 terminating in opposed concentric spherical recesses 70 and 72 and interconnected by a segmental spherical side wall 74. An inlet port 76 is formed through the frusto conical top wall 66 inwardly of the annular screen 78 so that liquid entering through the port 30 of the casting 12 is filtered through the screen 78 prior to entry into the measuring chamber 64 through the inlet port 76. An outlet port 79 into chamber 60 is formed through the spherical side wall 74 in circumferentially spaced relation to the inlet port 76 on the opposite side of the flow division member 80 in accordance with conventional practice.

The nutating disc 82 is formed by spherical segments 84 and 86 seated within recesses 70 and 72 respectively, a circular disc 88 confined coaxially between segments 84 and 86, and rigidly clamped in assembled position by a hollow bolt or pin 90 coaxially recessed within and projecting through segment 84, and central aperture of disc 88 and through the aligned aperture in the segment 86. The lower end of bolt 90 is threaded to receive a nut 92 which is recessed within the spherical segment 86.

Disposed within the longitudinally extending coaxial bore 94 of the hollow bolt 90 is a longitudinally polarized cylindrical bar magnet 96 which may be formed of Alnico or other suitable magnetic material and is permanently magnetized. Bolt 90 is formed of stainless steel. The end of magnet 96 projecting beyond the end of the bore 94 is protected from corrosion by a corrosion preventive cap 98 formed of any suitable non magnetic corrosion preventive, wear resistant material such as plastic, synthetic rubber or the like.

As will be explained, the magnet 96 functions both as the driving member of the magnetic coupling 28 interconnecting the measuring chamber unit 26 with the register 24 and as one element of a magnetic coupling guiding the movement of the nutating disc 82.

A register mechanism 24 is provided with a gear train and drive such as that disclosed in copending application Serial No. 276,652 filed March 14, 1952, by R. Z. Hague et al. issued October 28, 1958, as United States Patent No. 2,858,461 for Meter Registers and Drive Mechanism Therefor, and is provided with a hollow casing 100 of generally concave configuration terminating in a coaxial through aperture 102 through which projects a tubular support 104 of non magnetic material which is fixed to the casing 100 by welding or brasing and in effect forms a tubular extension of the casing 100. The upper end of the casing 100 is closed by a transparent window member 106 formed of glass or other suitable transparent material and which is maintained in air tight relation with the casing 100 by compressed annular gasket elements 108 and 110. The casing 100 is a factory sealed air tight unit which may be opened only by the destruction of the casing 100 due to the construction in which, in final assembly, the lip 112 at the top edge of the casing 100 is spun over the gasket 110 to form a permanently sealed unit.

The tubular member 104 projects through an aperture 114 formed through the partition 22 in coaxial alignment with the measuring device 26. The lower end of the tubular member 104 is threaded as indicated at 116 to receive a retainer nut 118 formed of magnetically permeable ferro magnetic material. Nut 118 functions as a retainer to maintain the register 24 rigidly in position on the casting 12 and in fluid tight relationship therewith through the intermediary of the gasket 120 and is formed with an annular hub 121 which attracts the upper end of the magnet 96 to guide the movement of the nutating disc 82.

The hub 121 of the retainer 118 is of greater diameter than the diameter of the path of movement of the top end of the magnet 96 and concentric therewith so that the magnetic attraction between magnet 96 and the adjacent portion of the retainer ring 118 magnetically biases the nutating disc 82 to a position in which it is in substantial line contact with the inner surface of the frusto-conical wall 68 on one side and at a diametrically disposed position also in substantial line contact with the opposed inner frusto conical surface of the wall 66 throughout the entire path of nutating movement of the disc 82.

A safety control pin 122 having a conical end is fixed through a coaxial aperture in the tubular member 104 and projects into the center of the conical path of movement of the top of the magnet 96 and the conical recess 123 of segment 84 to assure that magnet 96 and disc 88 will be maintained off its dead center position in coaxial alignment with the tubular member 104. The pin 122 other than assuring that the magnet 96 and disc 88 will not assume a dead center position has no guiding function in relation to the nutating disc 82, the entire guiding action being through the magnetic attraction between the upper end of the magnet 96 and the adjacent portion of the magnetic control ring 118.

This construction eliminates the necessity of the very accurately machined and located control ring herebefore used in prior nutating disc type meter. The expense of maintenance of close tolerances in meters of this type is thus eliminated by the present invention.

The magnetic coupling 28 between the register 24 and the nutating disc 82 comprises a steel ball 124 driven through the magnetic attraction between it and the upper end of the magnet 96 and disposed within an annular race 126 of semicircular radial cross section in the bottom wall of support 104. A thin wire crank or spindle 128, having a lower portion disposed within the path of movement of the ball 124 about the annular race 126 and an upper portion by which it is journalled for rotation about an axis coincident with the axis of the tubular member 104 and the raceway 126, is driven by ball 124. Crank 128 terminates in an upper end above the journalling structure 130 and has secured thereto a drive pinion 132 which is geared to a register drive train in the same manner as the structure illustrated in the aforesaid copending application Serial No. 276,652, now Patent No. 2,858,461. Reference to said application is made in the event further detailed description is needed to an understanding of the present invention.

In the second embodiment of the invention illustrated in FIGURE 2, a cylindrical boss 140 is formed on the exterior surface of the lower housing member 42 coaxially with the axis of the measuring chamber device 26 and on which is received a second control ring 142 formed of magnetically permeable material. In this embodiment of the invention, the magnet 96' is slightly longer than the magnet 96 of the embodiment of FIGURE 1 so that its lower end is more closely adjacent the profile of the pivot ball defined by the spherical segments 84 and 86. The lower end of magnet 96' is attracted to the most closely adjacent portion of the control ring 142 and the upper end of the magnet 96' is attracted to the diametrically opposed most closely adjacent portion of the control ring 118. The effect of these control rings upon the movement of the nutating discs is exactly the same as has been described in the FIGURE 1 embodiment, the use of two control rings providing stronger and more effective biasing force upon the nutating disc 82 when necessary.

If desired a single control ring at the bottom, such as the control ring 142, may be used without the use of an upper control ring 118.

The application of the principles of the present invention to a mechanically coupled nutating disc type meter is illustrated in FIGURE 3.

The meter therein illustrated comprises a meter casing structure 150, defining an upper chamber 152, receiving a register mechanism 154, and a lower chamber 156, receiving a nutating disc type measuring chamber device 158, and reduction gearing 160. Fluid enters the meter through the inlet port 162 formed in the casing 150 through a segmental screen 164, into the chamber 156, enters the measuring chamber device 158, through an inlet port in the top and bottom walls thereof (not shown) disposed circumferentially on one side of the flow division plate 166, and is discharged from the measuring chamber device 158 into the outlet port 168 of the meter casing 150 through a peripheral side wall opening which is in fluid communication with the discharge port 168 and the periphery of which is in fluid tight relation with the abutting portion of the casting 150 about the port 168 in accordance with conventional practice. Measuring chamber device 158 consists of upper and lower housing parts 170 and 172, having opposed frusto conical interior surfaces 174 and 176 interconnected by a segmental spherical side wall 178, and formed with opposed concentric segmental spherical recesses 180 and 182 to receive the spherical segments 184 and 186 of the pivot ball for the nutating disc 188. Disc 188 comprises opposed spherical segments 184 and 186, each of which is formed of hard rubber and which confine therebetween the internally reinforced circular disc portion 190. The spherical segments 184 and 186 are fixed together by a bolt 192 extending therethrough and threadedly engaged with a nut 194 to the upper end of which is coaxially fixed a stainless steel drive stud shell 196 which is of hollow construction and houses a permanently longitudinally polarized bar magnet 198. Drive stud 196 engages the radially projecting portions of a key or dog 200 fixed coaxially to the lower end of a drive spindle 202 journalled by a bushing 204 in a casting 206 piloted upon the upper housing half 170. Spindle 202 is drive connected through conventional reduction gearing 208 and a drive coupling 210 to the input spindle 212 of the register mechanism 154 in accordance with conventional practice. Leakage of fluid from casting 150 along shaft 212 is prevented by a gasket 214 and O-ring 216 received on spindle 212 and mounted on a nut 218 in a manner fully shown and described in co-pending application Serial No. 229,926, filed June 5, 1951, by R. Z. Hague et al. for Stuffing Box for Water Meters issued March 11, 1958, as United States Patent No. 2,826,069.

In order to guide the movement of the nutating disc 188, I provide a ring formed of soft iron or other suitable magnetically permeable material designated 220 and having upper and lower cylindrical piloting portions 222 and 224 by which it is aligned with the casting 206 and the upper measuring chamber part 170 respectively, and an integral interconnecting frusto conical portion 226 having an apex angle substantially equal to the apex angle of the conical path of movement of the magnet 198 and coaxial therewith so that a substantially uniform spacing is maintained between the most closely adjacent portions of magnet 198 and the frusto conical portion 226 along the length of the magnet 198 and throughout its path of movement.

As in the previous embodiments the attraction between the magnet 198 and the soft iron control ring 220 guides the movement of the nutating disc throughout its nutating path and eliminates the necessity for accurately machined control rings as heretofore required for accurate meter registration.

The bottom access opening of the casting 150 is closed by a frangible frost plate 230 having a corrosion preventive lining of non-corrosive metal 232 and maintained in fluid tight relation with the casting 150 by an annular gasket 234 and is fixed to the casting 150 by suitably spaced bolts 236.

From the foregoing detailed description it is apparent that the present invention provides a new and improved construction for controlling the path of movement of nutating discs in nutating disc type water meters which completely eliminates the necessity for the accurately machined and located control rings heretofore required and which is applicable to nutating disc type meters of both magnetically coupled and mechanically coupled types.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a nutating disc type fluid flow measuring device comprising a housing defining a nutating disc type measuring chamber having an inlet and an outlet port and a disc having a central axis and mounted for nutating movement therein, coacting magnetic means on said housing and said disc continuously magnetically biasing said disc so that the axis thereof is maintained from coaxial alignment with the axis of said measuring chamber to elastically confine the movement thereof to a predetermined nutating path in response to fluid flow through said measuring device while maintaining said disc free of rigid confinement to said predetermined path.

2. In combination with a nutating disc type fluid flow measuring device comprising a housing defining a nutating disc type measuring chamber having an inlet and an outlet port and a disc mounted for nutating movement therein, magnetic means for controlling the path of nutating movement of said disc in said chamber, wherein said magnetic control means comprises magnetically attracted members, at least one of said members being mounted on said disc and at least a second of said members being fixed relative to said housing.

3. In combination with a nutating disc type meter having a register, a nutating disc type fluid flow measuring device defining a measuring chamber including a disc having a central axis mounted for nutating movement in said chamber in response to fluid flow therethrough, a drive connection between said register and said nutating disc, housing structure enveloping said measuring device and provided with an inlet, an outlet, and fluid passages therein for confining fluid flow between said inlet and said outlet to a path through said measuring device, and means in said meter for continuously magnetically biasing said disc so that the axis thereof is maintained from coaxial alignment with the axis of said measuring chamber to elastically confine the movement thereof to a predetermined path in response to fluid flow through said measuring device while maintaining said disc free of rigid confinement to said predetermined path.

4. In combination with a nutating disc type meter having a register, a nutating disc type fluid flow measuring device defining a measuring chamber and including a disc mounted for nutating movement in said chamber in response to fluid flow therethrough, a drive connection between said register and said nutating disc, housing structure enveloping said measuring device and provided with an inlet, an outlet and fluid passages therein for confining fluid flow between said inlet and said outlet to a path through said measuring device, coacting magnetic means fixed relative to said measuring chamber and relative to said disc respectively for controlling the movement of said disc to a predetermined path throughout its nutating movement in response to fluid flow through said measuring device.

5. In combination with a nutating disc type meter having a register, a nutating disc type fluid flow measuring device defining a measuring chamber and including a disc mounted for nutating movement in said chamber in response to fluid flow therethrough, a drive connection between said register and said nutating disc, housing structure enveloping said measuring device and provided with an inlet, an outlet and fluid passages therein for confining fluid flow between said inlet and said outlet to a path through said measuring device, magnetic means for controlling the movement of said disc to a predetermined path throughout its nutating movement in response to fluid flow through said measuring device, wherein said magnetic means comprises an annular member of magnetic material, and a second member of magnetic material, at least one of said members being a permanent magnet and the other being attracted thereto, one of said members being mounted in fixed coaxial relation to the axis of said measuring chamber and the other being mounted in fixed coaxial relation to said disc.

6. The combination defined in claim 5, wherein said annular member is fixed relative to said measuring chamber and said second member is fixed to said disc.

7. The combination defined in claim 5, wherein said annular member is mounted in surrounding relation to said drive connection.

8. The combination defined in claim 6, wherein said annular member is mounted on said measuring device at the side of said disc remote from said drive connection.

9. The combination defined in claim 5, wherein a static fluid tight seal, a portion of which is formed of non-magnetic material, is interposed between said measuring device and said register, wherein said drive connection includes a magnetic drive coupling through said static seal, and wherein said second member forms the driving element of said magnetic drive coupling.

10. The combination defined in claim 5, wherein said drive connection includes a pin coaxially fixed to said disc, a spindle journalled for rotation coaxially with said chamber and a key fixed to said spindle and having a portion thereof disposed within the path of movement of said pin, and wherein said pin is hollow and of non-magnetic material and wherein said second member is disposed within said pin.

11. A nutating disc type positive displacement meter comprising housing structure including a continuous external wall and having an inlet, and an outlet, and fluid passages formed therein for guiding the flow of fluid between said inlet and said outlet, a nutating disc type positive displacement measuring device mounted within said housing between said inlet and said outlet and cooperating with said housing to confine fluid flow between said inlet and said outlet to a path through said measuring device, a registering device mounted on said housing exteriorly of said continuous wall, coacting magnetic means fixed relative to said measuring device and to said disc respectively for guiding the nutating disc of said measuring device and forming a drive coupling between said measuring device and said registering device while maintaining said measuring device free of radial restraint by said housing.

12. In combination with a positive displacement type fluid flow measuring device comprising a housing defining an annular measuring chamber having a central axis and an inlet port and outlet port and a fluid flow responsive element disposed in said measuring chamber for oscillatory movement therein about said axis in response to fluid flow between said inlet and said outlet ports, magnetic means magnetically biasing movement of said element in said chamber transversely of and from coaxial alignment therein with the axis of said chamber to a predetermined oscillatory path therein, said magnetic control means comprising magnetically coupled members of magnetic material, at least one of said members being mounted on said element and at least a second of said members being fixed relative to said housing.

13. The combination defined in claim 12 wherein one of said magnetic control means members is an annular member of magnetic material.

14. The combination defined in claim 12 wherein at least one of said one and second members is a permanent magnet and the other is attracted thereto.

References Cited in the file of this patent

UNITED STATES PATENTS

| | | |
|---|---|---|
| 620,791 | Meinecke | Mar. 7, 1899 |
| 941,573 | Gumprecht | Nov. 30, 1909 |
| 2,487,783 | Bergman | Nov. 15, 1949 |